United States Patent
Mathon et al.

(10) Patent No.: US 9,452,562 B2
(45) Date of Patent: Sep. 27, 2016

(54) IMPREGNATION CLAMPING MANDREL FOR MAKING GAS TURBINE CASINGS MADE OF COMPOSITE MATERIAL

(71) Applicant: SNECMA, Paris (FR)

(72) Inventors: Richard Mathon, Brunoy (FR); Olivier Patrigeon, Nanterre (FR)

(73) Assignee: SNECMA, Paris (FR)

( * ) Notice: Subject to any disclaimer, the term of this patent is extended or adjusted under 35 U.S.C. 154(b) by 117 days.

(21) Appl. No.: 14/352,856

(22) PCT Filed: Oct. 17, 2012

(86) PCT No.: PCT/FR2012/052366
§ 371 (c)(1),
(2) Date: Apr. 18, 2014

(87) PCT Pub. No.: WO2013/060965
PCT Pub. Date: May 2, 2013

(65) Prior Publication Data
US 2014/0283977 A1    Sep. 25, 2014

Related U.S. Application Data

(60) Provisional application No. 61/551,539, filed on Oct. 26, 2011.

(51) Int. Cl.
| | | |
|---|---|---|
| *B29C 53/82* | (2006.01) | |
| *B29C 70/32* | (2006.01) | |
| *B29C 70/54* | (2006.01) | |

(Continued)

(52) U.S. Cl.
CPC ............. *B29C 53/821* (2013.01); *B29C 53/56* (2013.01); *B29C 53/562* (2013.01); *B29C 70/32* (2013.01); *B29C 70/54* (2013.01); *B29C 70/541* (2013.01);

(Continued)

(58) Field of Classification Search
CPC .......... B29L 2031/7504; B29C 70/32; B29C 70/541; B29C 70/54; B29C 53/8075; B29C 53/821; B29C 53/56; B29C 53/562; B29C 53/824
See application file for complete search history.

(56) References Cited

U.S. PATENT DOCUMENTS

| 2008/0160122 A1 | 7/2008 | Blanton et al. |
| 2010/0288429 A1* | 11/2010 | Mathon ................... F01D 25/24 156/243 |
| 2011/0085911 A1 | 4/2011 | Schroder et al. |

FOREIGN PATENT DOCUMENTS

| DE | 10 2008 028 441 A1 | 12/2009 |
| EP | 1 938 955 A1 | 7/2008 |

(Continued)

OTHER PUBLICATIONS

International Search Report issued Feb. 7, 2013, in PCT/FR2012/052366, filed Oct. 17, 2012.

*Primary Examiner* — Jacob T Minskey
*Assistant Examiner* — Vishal I Patel
(74) *Attorney, Agent, or Firm* — Oblon, McClelland, Maier & Neustadt, L.L.P.

(57) ABSTRACT

An impregnation mandrel for production of gas turbine casings made from composite material, the mandrel including: an annular wall with a profile of an outer surface that corresponds to that of an internal surface of the casing to be produced; two side plates, with profiles that correspond to those of external casing flanges to be produced; and a removable device for clamping a layer having a fibrous texture, which is wound around the mandrel.

8 Claims, 2 Drawing Sheets

(51) Int. Cl.
  *B29C 53/56*   (2006.01)
  *B29L 31/00*   (2006.01)
  *B29C 53/80*   (2006.01)
(52) U.S. Cl.
  CPC .... *B29C 53/8075* (2013.01); *B29L 2031/7504* (2013.01)

(56) References Cited

FOREIGN PATENT DOCUMENTS

| | | |
|---|---|---|
| EP | 2 308 670 A1 | 4/2011 |
| FR | 2 945 573 A1 | 11/2010 |

\* cited by examiner

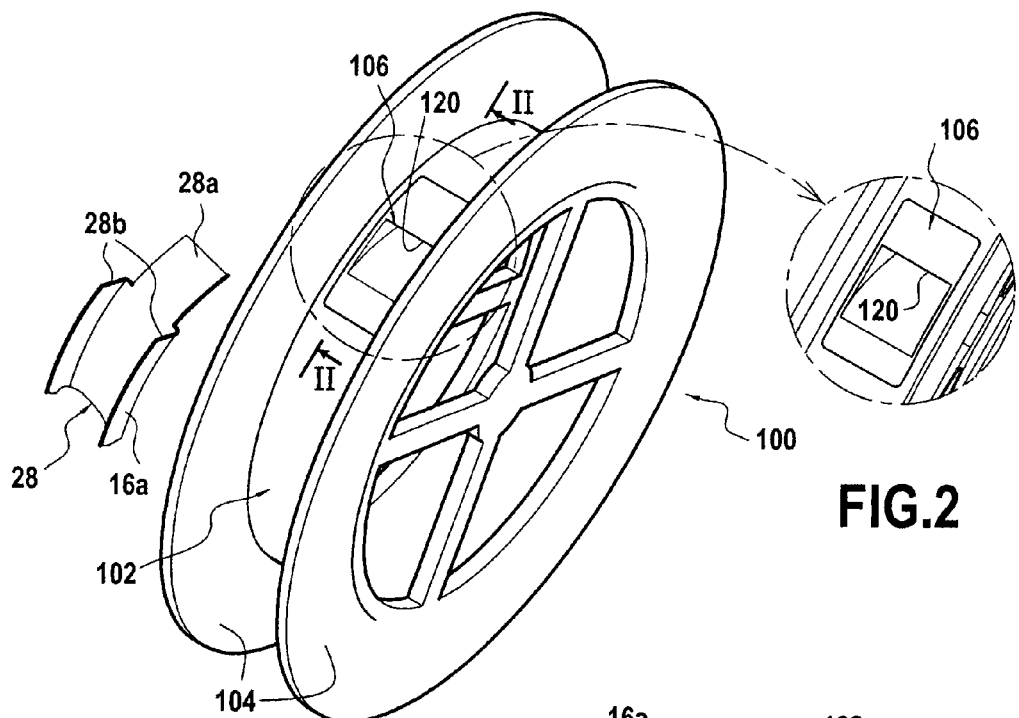
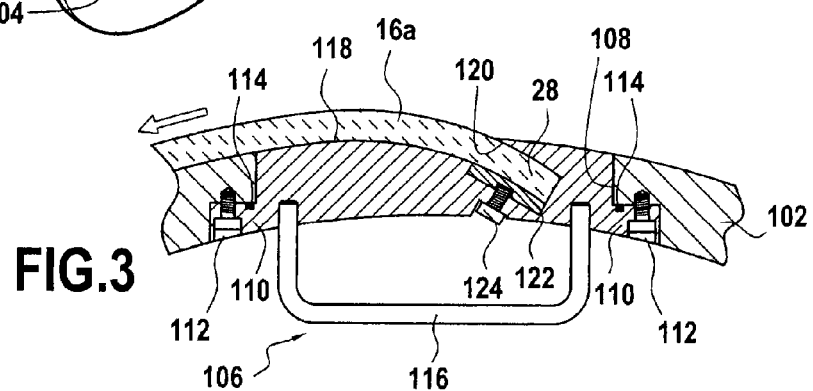
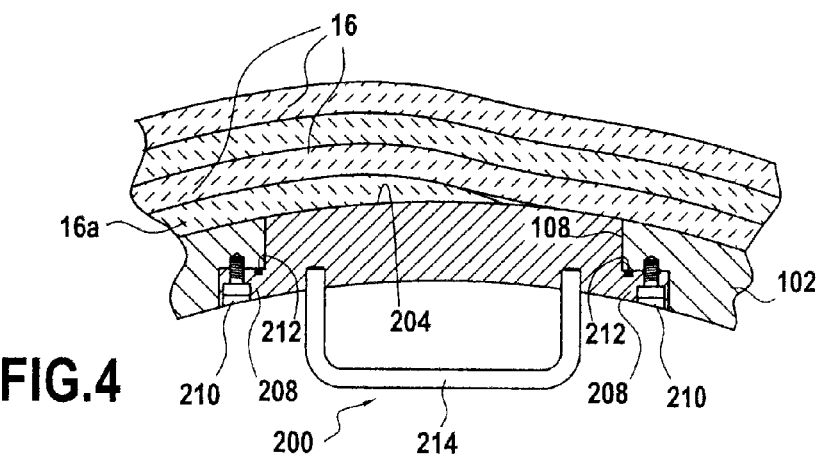

IMPREGNATION CLAMPING MANDREL FOR MAKING GAS TURBINE CASINGS MADE OF COMPOSITE MATERIAL

BACKGROUND OF THE INVENTION

The present invention relates to the general field of gas turbine casings, and more particularly holding casings of gas turbine fans for aeronautical engines.

In a gas turbine aeronautical engine, a fan casing fulfils a number of functions. It defines the incoming air stream to the engine, supports abradable material with respect to the tip of the fan vanes, supports an optional structure for sound wave absorption for acoustic inlet treatment of the engine and incorporates or supports a holding shield. The latter comprises a trap for catching debris such as ingested items or fragments of damaged vanes thrown out by centrifuge action to prevent them from passing through the casing and reaching other parts of the aircraft.

Making a casing for holding a fan made of composite material has already been proposed. Reference could be made to document EP 1 961 923 which describes the production of a casing made of composite material of evolutive thickness, comprising the formation of a fibrous reinforcement by superposed layers of a fibrous texture and densification of the fibrous reinforcement by a matrix. According to this invention, the fibrous texture is made by three-dimensional weaving with evolutive thickness and is wound in several superposed layers onto a mandrel having a central wall of profile corresponding to that of the casing to be manufactured and two lateral flanges of profile corresponding to those of the external flanges of the casing. The resulting fibrous preform is held on the mandrel and impregnation by resin is completed under vacuum prior to polymerisation. The winding on a mandrel of a woven texture of evolutive thickness as described in this document directly gives a tubular preform having the preferred profile with variable thickness.

In practice, carrying out this process poses the problem of holding the fibrous preform during its winding on the mandrel. During this winding, sufficient traction force should indeed be exerted on each layer of fibrous texture to ensure effective compaction of the letter. This requires in particular that the first layer of fibrous texture which is wound on the mandrel be correctly packed up against the latter before successive layers are wound on.

For this purpose, document FR 2 945 573 discloses an impregnation mandrel in which the hooking of the first layer of fibrous texture is done by a removable plate fitted with points which penetrate the layer of fibrous texture. Even though efficacious, this type of hooking can have the risk of seeing the points of the plate damage the fibrous preform if a too strong winding tension is applied on the latter.

AIM AND SUMMARY OF THE INVENTION

The principal aim of the present invention is therefore to rectify such drawbacks by proposing mechanical holding of the first layer of fibrous texture, which applies strong winding tension without the risk of damaging the fibrous preform.

This aim is attained by an impregnation mandrel for making gas turbine casings made of material composite, the mandrel comprising an annular wall whereof the profile of the external surface corresponds to that of the internal surface of the casing to be made, and two lateral flanges whereof the profiles corresponds to those of external flanges of the casing to be made, the mandrel also comprising, according to the invention, a removable clamping device of a layer of fibrous texture wound on the mandrel.

The clamping of the free end of the layer of fibrous texture wound on the mandrel prevents any risk of deterioration of the preform irrespective of the winding tension applied to the latter. Also, this clamping device is removable such that it can be withdrawn prior to resin impregnation to prevent any risk of degradation of the preform during the hot polymerisation operation. Finally, holding the first layer of fibrous texture on the mandrel is mechanical (and not chemical) which ensures total safety on the preform prior to resin impregnation.

The clamping device advantageously comprises a removable plate intended to be positioned in a corresponding recess made through the wall of the mandrel, said plate comprising an external surface whereof the profile is capable of reconstituting the profile of the external surface of the mandrel and a slot extending in position between the lateral flanges of the mandrel and intended to receive a free end of the layer of fibrous texture wound on the mandrel.

Such a clamping device preferably further comprises a pad capable of exerting a clamping force on the free end of the layer of fibrous texture wound on the mandrel by means of tightening screws. The tightening screws are advantageously accessible from the interior of the mandrel.

The plate of the clamping device can comprise fixing flanges which are intended in position to be fixed on the annular wall of the mandrel by means of fixing screws.

Also, the plate of the clamping device can comprise a grip accessible from the interior of the mandrel when the clamping plate is in position.

Another aim of the invention is a winding machine of a fibrous texture on an impregnation mandrel, comprising a take-up mandrel on which a fibrous texture produced by three-dimensional weaving is intended to be stored, the take-up mandrel having an axis of rotation substantially horizontal, an impregnation mandrel such as defined previously and on which the fibrous texture stored on the take-up mandrel is intended to be wound in superposed layers, the impregnation mandrel having a substantially horizontal axis of rotation parallel to the axis of rotation of the take-up mandrel, electric motors for driving the mandrels in rotation about their respective axis of rotation, and a control unit of the electric motors driving the mandrels in rotation.

Another aim of the invention is an impregnation method of a fibrous texture for making gas turbine casings made of material composite, comprising winding a first layer of fibrous texture on an impregnation mandrel such as defined previously, maintaining a free end of the first layer of fibrous texture on the impregnation mandrel by means of the clamping device, winding other layers of fibrous texture on the impregnation mandrel, withdrawal of the clamping device and its replacement by a sealing plug, and impregnating the fibrous texture wounded on the mandrel par resin injection.

BRIEF DESCRIPTION OF THE DRAWINGS

Other characteristics and advantages of the present invention will emerge from the following description, in reference to the attached diagrams which illustrate an embodiment devoid of any limiting character, in which:

FIG. 2 is a perspective view of the impregnation mandrel of FIG. 1;

FIG. 3 is a sectional view along III-III of FIG. 2; and

FIG. 4 is a view corresponding to FIG. 3 showing the impregnation mandrel on completion of winding.

DETAILED DESCRIPTION OF THE INVENTION

Figure 1:
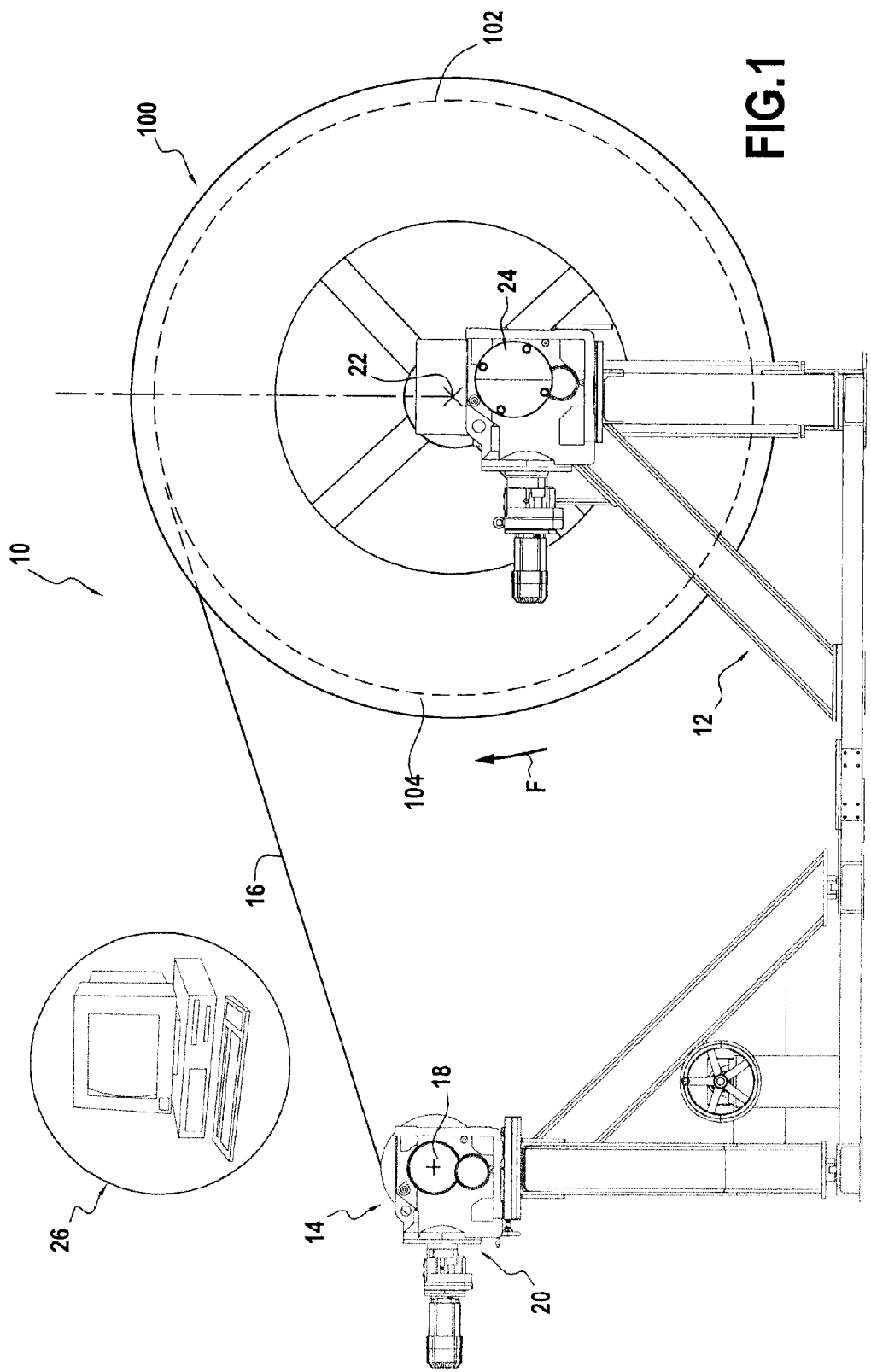
FIG. 1 is a schematic view and side elevation of a winding machine of a fibrous texture on an impregnation mandrel according to the invention.

The invention will now be described within the scope of its application to the production of a fan casing in an aeronautical engine with a gas turbine.

An example of a manufacturing process of such a fan casing is described in document EP 1 961 923 which can be referred to.

The casing is made of composite material with fibrous reinforcement densified by a matrix. The reinforcement is made of fibres such as carbon, glass, aramide or ceramic and the matrix is made of polymer, for example epoxide, bismaleimide or polyimide.

Briefly, the manufacturing process described in this document consists of making a fibrous texture by three-dimensional weaving with chain take-up on a drum (hereinbelow called take-up mandrel) having a profile determined as a function of the profile of the casing to be manufactured.

The resulting fibrous texture is then transferred to the mandrel of a resin injection mould (hereinbelow called impregnation mandrel) the external profile of which corresponds to the internal profile of the casing to be manufactured.

While the preform is held on the impregnation mandrel, impregnation is then done with resin. For this purpose, an envelope is applied to the preform and the resin is injected into the resulting mould. Impregnation is assisted by a difference in pressure being set between the exterior and the interior of the mould containing the preform. After impregnation, a resin polymerisation step is carried out.

The invention applies to any type of winding machine whereof the function is automated transfer of the fibrous texture stored on the take-up mandrel to the impregnation mandrel of the resin injection mould, such as shown in FIG. 1.

Reference could be made to patent application FR 11 53212 (not yet published) which describes in detail the structure and operation of such a machine.

Briefly, the winding machine 10 comprises a frame 12 supporting especially a take-up mandrel 14 and an impregnation mandrel 100 according to the invention. These mandrels are removable, that is, they can be dismantled from the frame.

The take-up mandrel 14 receives the fibrous texture 16 produced for example by three-dimensional weaving. It is borne by a horizontal axle 18 one end of which is mounted to rotate on the frame 12 of the winding machine and the other end is coupled to the output shaft of an electric engine 20, for example an electric motoreducer on alternating current.

The assembly constituted by the take-up mandrel 14, its axle 18 and its electric engine 20 can translate relative to the frame along the axis of rotation of the take-up mandrel. This degree of liberty in translation of the take-up mandrel creates alignment of this mandrel on the impregnation mandrel prior to winding of the fibrous texture on the impregnation mandrel.

The impregnation mandrel 100 of the winding machine is intended to receive the fibrous texture stored on the take-up mandrel, in superposed layers. In a way known per se, it has a central annular wall 102 whereof the profile of the external surface corresponds to that of the internal surface of the casing to be made and two lateral flanges 104 whereof the profiles correspond to those of the external flanges of the casing at its upstream and downstream ends to enable it to be mounted and linked to other elements.

The impregnation mandrel is borne by a horizontal axis 22 which is parallel to the axis of rotation 18 of the take-up mandrel and whereof one end is mounted to rotate on the frame 12 of the winding machine and the other end is coupled to the output shaft of an electric engine 24, for example an electric motoreducer on alternating current.

A control unit 26 is connected to the electric motors 20, 24 of the two mandrels and controls the rotation speed of each mandrel. More generally, this control unit controls all the operating parameters of the winding machine, and especially the displacement in translation of the take-up mandrel when motorised.

With such a machine, winding of the fibrous texture on the impregnation mandrel is done as follows: the free end of the fibrous texture of the take-up mandrel is first fixed on the impregnation mandrel by means of a device for holding by clamping described hereinbelow, then the engines for driving the mandrels in rotation are activated and controlled by the control unit so as to apply adequate winding tension on the fibrous texture.

Winding of the fibrous texture in superposed layers on the impregnation mandrel can then start and be executed in the direction of rotation marked by arrow F in FIG. 1. By way of example, it might be necessary to effect 4 turns ⅛ to produce a fibrous reinforcement having a thickness conforming to the specifications of the casing to be manufactured.

According to the invention, the impregnation mandrel 100 comprises a removable device for clamping the free end 28 of the first layer 16a of fibrous texture which is wound on the impregnation mandrel.

More precisely, as shown in FIG. 2, this device comprises especially a plate 106 which ensures clamping of this free end of the first layer of fibrous texture.

This plate 106 is removable and is intended to be positioned at the start of the winding operation in a corresponding recess 108 through the annular wall 102 of the mandrel. For this purpose, the plate of the clamping device comprises two opposite fixing flanges 110 which are fixed on the annular wall of the mandrel by means of fixing screws 112, and sealing joints 114 which can also be inserted between the flanges and the annular wall of the mandrel.

The plate 106 can also comprise a grip 116 which makes gripping easier. It is evident that this grip and the fixing screws 112 are accessible from the interior of the impregnation mandrel.

The external surface 118 of the plate 106 of the clamping device is profiled so as to reconstitute the profile of the external surface of the annular wall 102 of the impregnation mandrel when it is mounted on the latter.

The plate 106 of the clamping device also has a slot 120 extending transversally between the two lateral flanges 104 of the mandrel, this slot being dimensioned to receive the free end 28 of the first layer 16a of fibrous texture wound on the mandrel to hold it by clamping.

Also, a pad 122 is housed inside the plate at the level of the slot 120, this pad being capable of being gripped tightly against the free end 28 of the first layer 16a of fibrous texture by way of tightening screws 124 accessible from the interior of the mandrel (FIG. 3). So, once the end of the first layer of fibrous texture is inserted into the slot of the plate, the tightening screws 124 are screwed so as to exert clamping force of this end of layer of fibrous texture between the pad 122 and the annular wall 102 of the plate 106.

It is evident that only that part 28a of the end 28 of the first layer 16a of fibrous texture which is intended to reconstitute the internal surface of the casing to be made is held by clamping on the impregnation mandrel (the parts of this end of the first layer of fibrous texture which are intended to reconstitute the external flanges of the casing to be made are not). In fact, no winding tension is applied at the level of its parts of the fibrous texture during its winding on the impregnation mandrel, such that it is unnecessary to provide holding for the latter. Also, this solution has the advantage of simplifying the holding device.

Also, so that only the part 28a of the end 28 of the first layer of fibrous texture which is intended to reconstitute the internal surface of the casing to be made is inserted into the slot 120 of the plate 106 to be held there by clamping, it is first necessary to cut out this free end 28 as shown in FIG. 1, especially at the level of the parts 28b which will reconstitute the external flanges of the casing.

Once all the layers of fibrous texture are wound on the impregnation mandrel, the clamping device is withdrawn prior to the resin impregnation operation. For this purpose, the tightening screws 124 of the washer, as well as the fixing screws 112 of the plate 106 are unscrewed so as to release the plate from its recess 108 in the impregnation mandrel.

Once the plate 106 is withdrawn, the free end of the first layer 16a of fibrous texture which projects inside the mandrel can be cut off, for example using a cutter blade. Alternatively, this free end can be left in place, which consequently requires adapting the geometry of the sealing plug described hereinbelow, so as to integrate the overthickness attached to this layer.

A sealing plug 200 such as that shown in FIG. 4 is then positioned in the recess 108 of the impregnation mandrel in place of the plate 106 of the clamping device. Such a plug is overall identical to the clamping plate, except that it has no slot or pad. In particular, the latter has an external surface 204 reconstituting the profile of the external surface of the annular wall of the mandrel and can be fixed on the latter by means of fixing flanges 208 and screws 210 (sealing joints 212 can also be inserted). The plug also comprises a grip 214 accessible from the interior of the mandrel. Once the plug 200 is in place and fixed on the impregnation mandrel, the resin impregnation operation can start.

The invention claimed is:

1. An impregnation mandrel for making a gas turbine casing made of composite material, the mandrel comprising:
    an annular wall with a profile of an external surface that corresponds to that of an internal surface of the casing to be made;
    two lateral flanges with profiles that correspond to those of external flanges of the casing to be made; and
    a removable clamping device to clamp a layer of fibrous texture wound on the mandrel between two surfaces of the removable clamping device, the removable clamping device including;
        a removable plate configured to be positioned in a corresponding recess made through the annular wall of the mandrel.

2. The mandrel according to claim 1, wherein the removable plate of the removable clamping device comprises an external surface with a profile capable of reconstituting a profile of an external surface of the mandrel and a slot extending in position between the lateral flanges of the mandrel and configured to receive a free end of the layer of fibrous texture wound on the mandrel.

3. The mandrel according to claim 2, wherein the removable clamping device further comprises a pad configured to exert a clamping force on the free end of the layer of fibrous texture wound on the mandrel by tightening screws.

4. The mandrel according to claim 3, wherein the tightening screws are accessible from an interior of the mandrel.

5. The mandrel according to claim 2, wherein the removable plate of the removable clamping device comprises fixing flanges which when in position are configured to be fixed on the annular wall of the mandrel by fixing screws.

6. The mandrel according to claim 2, wherein the removable plate of the removable clamping device comprises a grip accessible from an interior of the mandrel when the removable plate is in position.

7. A winding machine of a fibrous texture on an impregnation mandrel, comprising:
    a take-up mandrel on which a fibrous texture produced by three-dimensional weaving is configured to be stored, the take-up mandrel having a substantially horizontal axis of rotation;
    the impregnation mandrel according to claim 1 on which the fibrous texture stored on the take-up mandrel is configured to be wound in superposed layers, the impregnation mandrel having a substantially horizontal axis of rotation parallel to the axis of rotation of the take-up mandrel;
    electric motors to drive the mandrels in rotation about their respective axis of rotation; and
    a control unit of the electric motors to drive the mandrels in rotation.

8. An impregnation method of a fibrous texture for making gas turbine casings made of material composite, comprising:
    winding a first layer of fibrous texture on the impregnation mandrel according to claim 1;
    maintaining a free end of the first layer of fibrous texture on the impregnation mandrel by the removable clamping device;
    winding other layers of fibrous texture on the impregnation mandrel;
    withdrawing the removable clamping device and replacing the removable clamping device with a sealing plug; and
    impregnating the fibrous texture wounded on the mandrel by resin injection.

* * * * *